(12) United States Patent
Wiedmann et al.

(10) Patent No.: US 11,539,320 B2
(45) Date of Patent: Dec. 27, 2022

(54) CONTROL DEVICE FOR AN INVERTER, INVERTER FOR AN ASYNCHRONOUS MACHINE, VEHICLE AND METHOD FOR OPERATING AN INVERTER

(71) Applicant: Valeo Siemens eAutomotive Germany GmbH, Erlangen (DE)

(72) Inventors: Karsten Wiedmann, Spardorf (DE); Markus Reymann, Nuremberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 17/276,290

(22) PCT Filed: Sep. 19, 2019

(86) PCT No.: PCT/EP2019/075190
§ 371 (c)(1),
(2) Date: Mar. 15, 2021

(87) PCT Pub. No.: WO2020/058411
PCT Pub. Date: Mar. 26, 2020

(65) Prior Publication Data
US 2022/0029570 A1    Jan. 27, 2022

(30) Foreign Application Priority Data

Sep. 20, 2018 (DE) .................... 10 2018 123 206.3

(51) Int. Cl.
*H02P 27/06* (2006.01)
*H02P 3/14* (2006.01)
(Continued)

(52) U.S. Cl.
CPC .............. *H02P 27/06* (2013.01); *B60L 50/51* (2019.02); *H02M 7/5387* (2013.01)

(58) Field of Classification Search
CPC .... H02P 3/14; H02P 6/085; H02P 6/24; H02P 29/025; H02P 3/18; H02P 27/06;
(Continued)

(56) References Cited

U.S. PATENT DOCUMENTS 5,583,406 A * 12/1996 Mutoh .................... B60L 58/15
                                                             318/362
6,020,696 A *  2/2000 Matsunaga ............. B60L 50/60
                                                             318/717
(Continued)

FOREIGN PATENT DOCUMENTS

DE         4440823 A1    5/1995
DE    102010034483 A1    2/2012
(Continued)

OTHER PUBLICATIONS

PCT/ISA/210, "International Search Report for International Application No. PCT/EP2019/075190," dated Nov. 26, 2019.
(Continued)

*Primary Examiner* — Thai T Dinh
(74) *Attorney, Agent, or Firm* — Manabu Kanesaka

(57) ABSTRACT

A control device for an inverter has a DC voltage input and a power unit with three half-bridges each formed by two power switching elements, the control device being arranged to driving the power switching elements in a normal operating mode for converting a DC voltage applied to the DC voltage input into a polyphase AC current provided at an AC current output. The control device is adapted to evaluate a signal state of a signal indicating a disconnection of a DC voltage source from the DC voltage input and to control the power switching elements in dependence on a result of the evaluation for alternately adopting a first switching pattern causing DC braking and a second switching pattern causing freewheeling.

15 Claims, 3 Drawing Sheets

Figure 1:
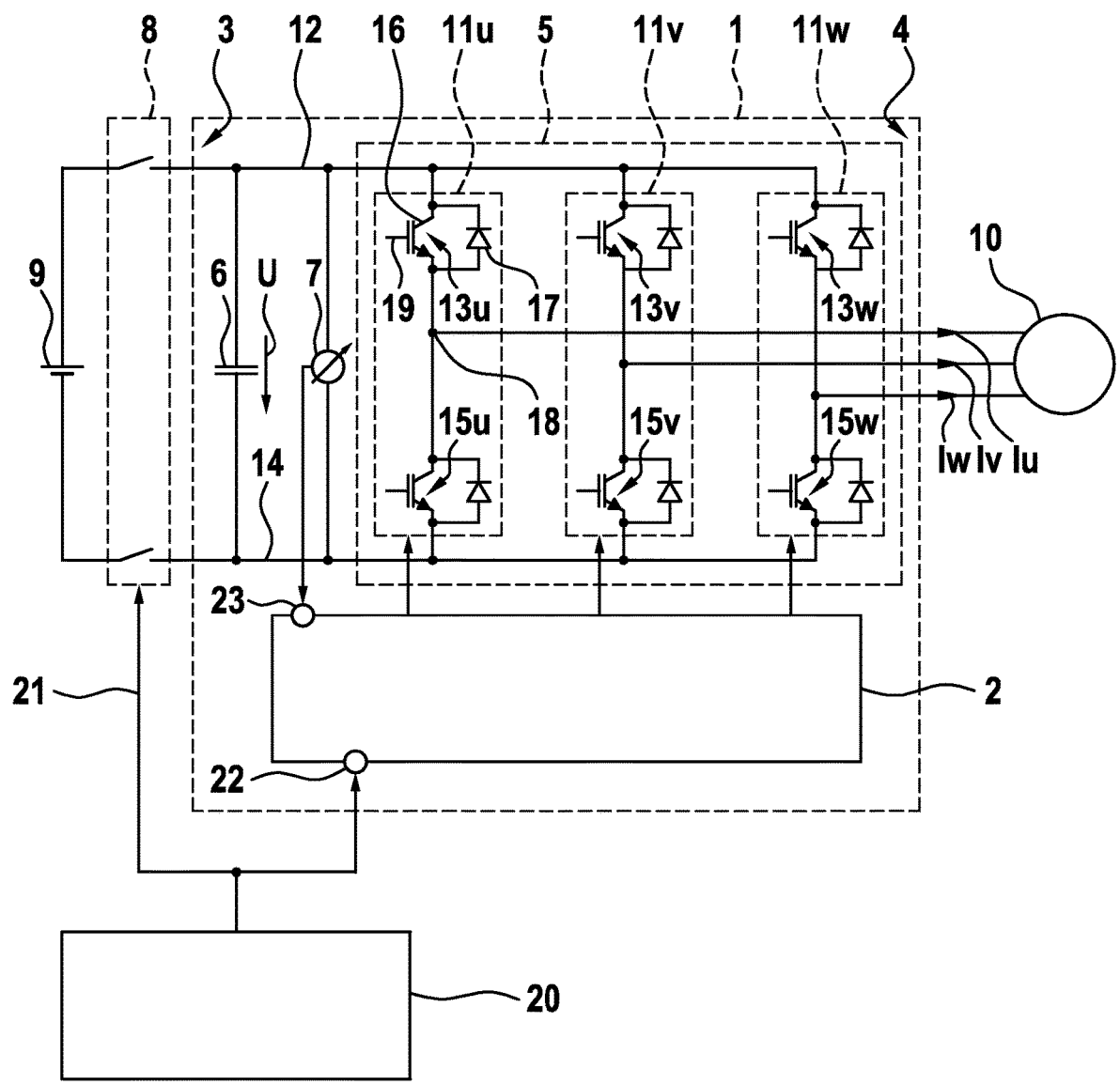

(51) Int. Cl.
*H02P 6/24* (2006.01)
*B60L 50/51* (2019.01)
*H02M 7/5387* (2007.01)

(58) Field of Classification Search
CPC .. B60L 7/16; B60L 7/18; B60L 50/51; H02M 7/5387; H02M 1/32
See application file for complete search history.

(56) References Cited

U.S. PATENT DOCUMENTS

| | | | | |
|---|---|---|---|---|
| 6,236,172 B1* | 5/2001 | Obara | ............... | B60L 50/51 |
| | | | | 318/722 |
| 8,674,637 B2* | 3/2014 | Kamijo | ............... | B60L 58/25 |
| | | | | 180/65.21 |
| 8,884,556 B2* | 11/2014 | Yoo | ............... | B60L 3/003 |
| | | | | 318/139 |
| 8,907,612 B2* | 12/2014 | Linda | ............... | B60L 15/10 |
| | | | | 318/722 |
| 10,351,002 B2* | 7/2019 | Saha | ............... | B60L 3/04 |
| 2012/0217920 A1* | 8/2012 | Singh | ............... | G01R 31/42 |
| | | | | 318/490 |
| 2017/0305274 A1* | 10/2017 | Saha | ............... | B60L 3/003 |

FOREIGN PATENT DOCUMENTS

DE 102016200663 A1 7/2017
JP 2015-198463 A 11/2015

OTHER PUBLICATIONS

C. Somers et al., Emergency DC Injection Braking System, 2015 IEEE International Conference on Industrial Technology (ICIT), IEEE, Mar. 17, 2015, p. 726-730, DOI: 10.1109/ICIT.2015.7125184, XP032785250, the whole document.

* cited by examiner

CONTROL DEVICE FOR AN INVERTER, INVERTER FOR AN ASYNCHRONOUS MACHINE, VEHICLE AND METHOD FOR OPERATING AN INVERTER

RELATED APPLICATIONS

The present application is National Phase of International Application No. PCT/EP2019/075190 filed Sep. 19, 2019, and claims priority from German Application No. DE 10 2018 123 206.3 filed Sep. 20, 2018, the disclosure of which is hereby incorporated by reference herein in its entirety.

The present invention relates to a control device for an inverter which has a DC voltage input and a power unit having three half-bridges each formed by two power switching elements, the control device being arranged to drive the power switching elements in a normal operating mode for converting a DC voltage applied to the DC voltage input into a polyphase AC current provided at an AC current output.

In addition, the invention relates to an inverter for an asynchronous machine, a vehicle and a method for operating an inverter.

In a drive train of an electrically drivable vehicle, an inverter can be used to convert a DC voltage provided by a DC voltage source, for example a high-voltage battery, into a multi-phase AC voltage for an electric machine. During operation of the electric machine, disconnection of the DC voltage source from a DC voltage input of the inverter may occur. Such an event, also known as load shedding, is often a safety measure when a fault occurs. If the vehicle is in a recuperation mode during load shedding, energy stored in inductors of the electric machine is fed back to the DC input of the inverter, where it can cause an overvoltage that can damage a DC link capacitor and components connected to it.

In permanently excited synchronous machines, it is known to trigger power switching elements of the inverter to enter an active short circuit in order to convert the energy stored in the inductors into heat within the electrical machine. However, in the case of an asynchronous machine, immediate switching to the active short circuit in the event of load shedding causes very high currents through the power switching elements due to low leakage inductances of the asynchronous machine, which can be damaged as a result.

It is therefore common practice in asynchronous machines to significantly oversize the DC link capacitor so that it can withstand the overvoltage even when the load is dropped during recuperation operation. However, such a DC link capacitor is expensive and large. In addition, a recuperation torque can be limited to values at which no harmful overvoltage occurs in the event of load shedding. However, this reduces the efficiency and the operating range of the recuperation mode.

The invention is therefore based on the task of providing a way of handling load shedding, in particular in the case of an asynchronous machine, which eliminates the disadvantages mentioned above.

In order to solve this problem, the invention provides that a control device of the type mentioned above is set up to evaluate a signal state of a signal indicating a disconnection of a DC voltage source from the DC voltage input and to control the power switching elements as a function of a result of the evaluation for alternately adopting a first switching pattern, which effects DC braking, and a second switching pattern, which effects freewheeling.

The invention is based on the consideration that after a load shedding, i.e. after a disconnection of the voltage source from the DC input, there is an undesirable sharp increase in the voltage at the DC input when freewheeling is switched, whereas during DC braking there is a sharp drop in the voltage, which in extreme cases can lead to a harmful negative voltage at the DC input. Therefore, the invention proposes to switch alternately between these two modes of operation so that energy stored in inductors of the electric machine can be converted into heat and the effects of freewheeling and DC braking can cancel each other out.

The invention thus makes it possible to use a DC link capacitor designed for voltages normally occurring in recuperation operation, since exceeding its dielectric strength in freewheeling is avoided by switching to DC braking. Similarly, it is not necessary to limit a recuperation torque beyond that for the normal operating mode, so that efficiency losses are avoided by such a limitation. At the same time, there are no unacceptably high currents, as in the case of an active short circuit, which could damage the power switching elements.

The control device according to the invention is preferably further set up to evaluate, in addition to the signal state, whether the inverter is in a recuperation mode. In this way, the switching strategy alternating between the switching patterns can be limited to cases in which there is a particular risk of overloading the DC link capacitor.

Basically, switching from the first switching pattern, i.e. DC braking, to the second switching pattern, i.e. freewheeling, is done to break a resonant circuit between the inductors of the electric machine and the DC link capacitor, since the resonant circuit can cause the negative voltages at the DC link capacitor. From the second switching pattern to the first switching pattern it is typically switched so that the permissible voltage at the DC link capacitor is not exceeded.

According to an embodiment of the control device according to the invention that can be implemented with little effort, it is also set up to switch from the first switching pattern to the second switching pattern after a predefined time period has elapsed and/or to switch from the second switching pattern to the first switching pattern after a predefined time period has elapsed. The said time periods can be determined empirically on the basis of maximum possible recuperation voltages so that the resonant circuit is interrupted or the permissible voltage at the DC link capacitor is not exceeded.

In addition, the control device according to the invention can be set up to control the alternating control depending on a voltage value describing a voltage at the DC voltage input. For this purpose, the control device preferably has an input for the voltage value describing the voltage at the DC voltage input. The inverter then typically comprises a voltage detection unit, which is arranged to detect the voltage at the DC voltage input. Since such a voltage detection unit is provided in many cases anyway, no additional hardware effort is caused on the part of the inverter.

In addition or as an alternative to the previously described time control, it can be advantageously provided that the control device is also set up to switch from the first switching pattern to the second switching pattern when the voltage value detects that a voltage threshold value has been reached and/or to switch from the second switching pattern to the first switching pattern when the voltage value detects that a voltage threshold value has been reached. The voltage threshold values are then expediently selected so that the resonant circuit is interrupted at the correct time or the permissible voltage at the DC link capacitor is not exceeded. This enables particularly fast decay of the currents caused by the energy stored in the inductors.

In addition, the control device can also be set up to permanently trigger the power switching elements to adopt a switching pattern that brings about a safe operating state if the voltage value does not exceed a predefined voltage threshold when the power switching elements are triggered with the second switching pattern. If this is the case, the energy stored in the inductors of the electric machine is converted into heat to such an extent that the safe operating state can be permanently assumed and the vehicle can coast without undesirable braking torques, for example. The switching pattern that brings about the safe operating state is preferably the second switching pattern.

The first switching pattern typically describes that in the case of a half-bridge, the power switching element connected to a first potential of the DC voltage input is in the blocking state and the other is in the conducting state, in the case of a half-bridge, the power switching element connected to a second potential of the DC voltage input is in the blocking state and the other is in the conducting state, and in the case of a half-bridge, both power switching elements are in the blocking state. The specific design of the first switching pattern is preferably dependent on the phase angle at the AC output at the moment of load shedding. Indeed, an incorrect determination of the first switching pattern can either lead to no limitation of the DC voltage or to undesirably high currents through the power switching elements.

The control device according to the invention may therefore further be arranged to determine the first switching pattern as a function of at least one current value describing current flowing at the AC output. The current value may either be measured, in which case an input for the current value may be provided at the control device. Preferably, however, the current value is determined based on setpoints provided by the control device in the normal operating mode.

Preferably, the first switching pattern is provided to describe switching a power switching element connected to a high potential of the DC input to a conducting state when a current from the center tap of the half-bridge formed by the power switching element is positive and a change in the current after time is negative. Thereby, the switching pattern can describe the switching of the remaining power switching elements connected to the high potential of the DC input into a blocking state.

Further, the first switching pattern may describe switching a power switching element connected to the low potential of the DC input to a conducting state when a current from the center tap of the half-bridge formed by the power switching element is negative and a change in the current after time is positive. Thereby, the first switching pattern may describe switching of the remaining power switching elements connected to the low potential of the DC input to a blocking state.

Expediently, the second switching pattern describes the switching of all power switching elements to a blocking state.

In addition, the invention relates to an inverter for an asynchronous machine, comprising a DC voltage input, a power unit with three half-bridges each formed by two power switching elements, and a control device according to the invention.

The invention further relates to a vehicle comprising an asynchronous machine for driving the vehicle and an inverter according to the invention.

Finally, the invention relates to a method for operating an inverter which has a DC voltage input and a power unit with three half-bridges each formed by two power switching elements, comprising the following steps:

driving the power switching elements in a normal operating mode to convert a DC voltage applied to the DC input into a polyphase AC current provided at an AC output;

evaluating a signal state of a signal indicating a disconnection of a DC voltage source from the DC input; and driving the power switching elements in dependence on a result of the evaluation to alternately adopt a first switching pattern causing DC braking and a second switching pattern causing freewheeling.

All the explanations regarding the control device according to the invention can be applied analogously to the inverter according to the invention, the vehicle according to the invention and the process according to the invention, so that the advantages mentioned above can also be achieved with these.

Figure 2:
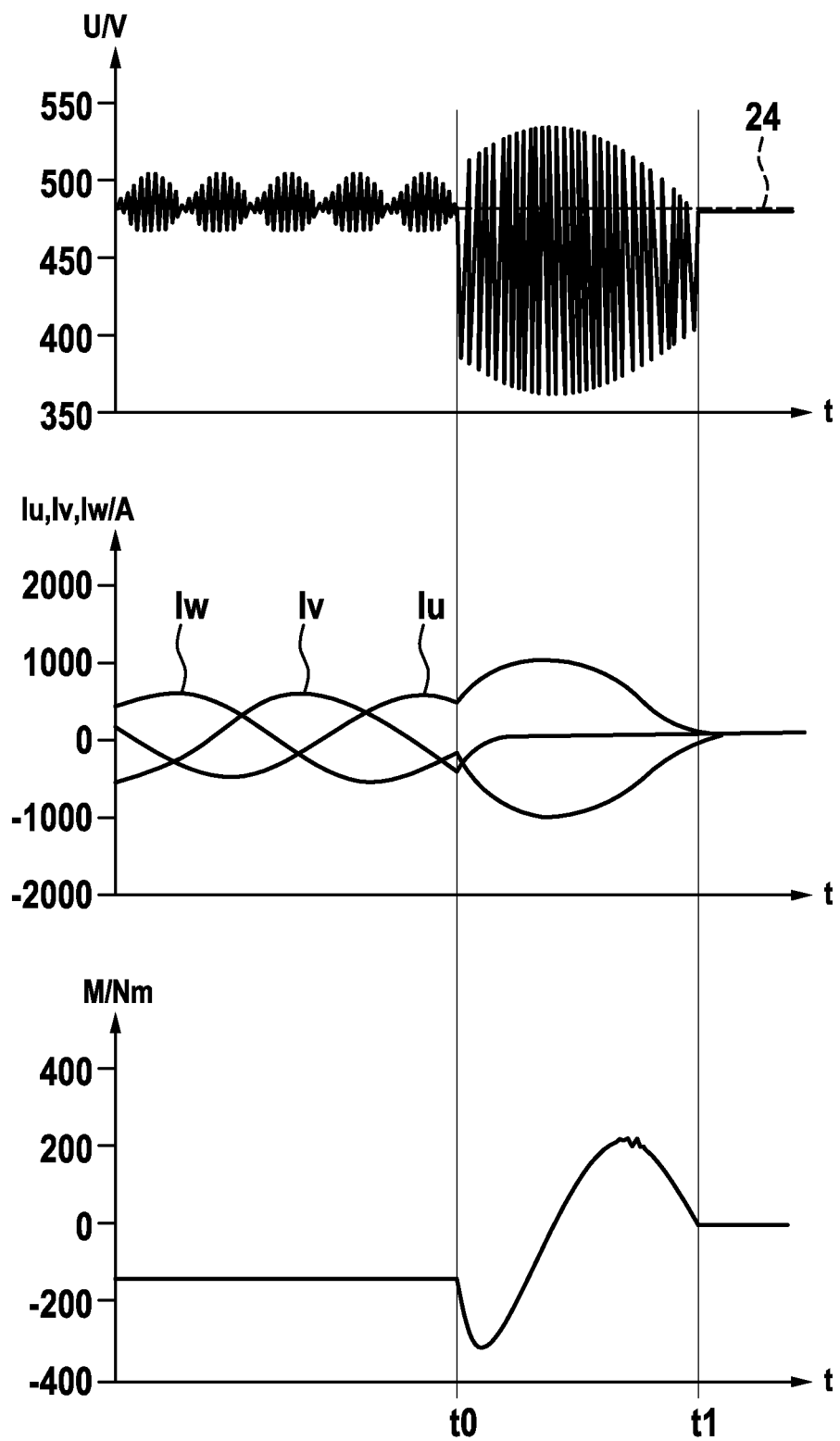
Figure 3:
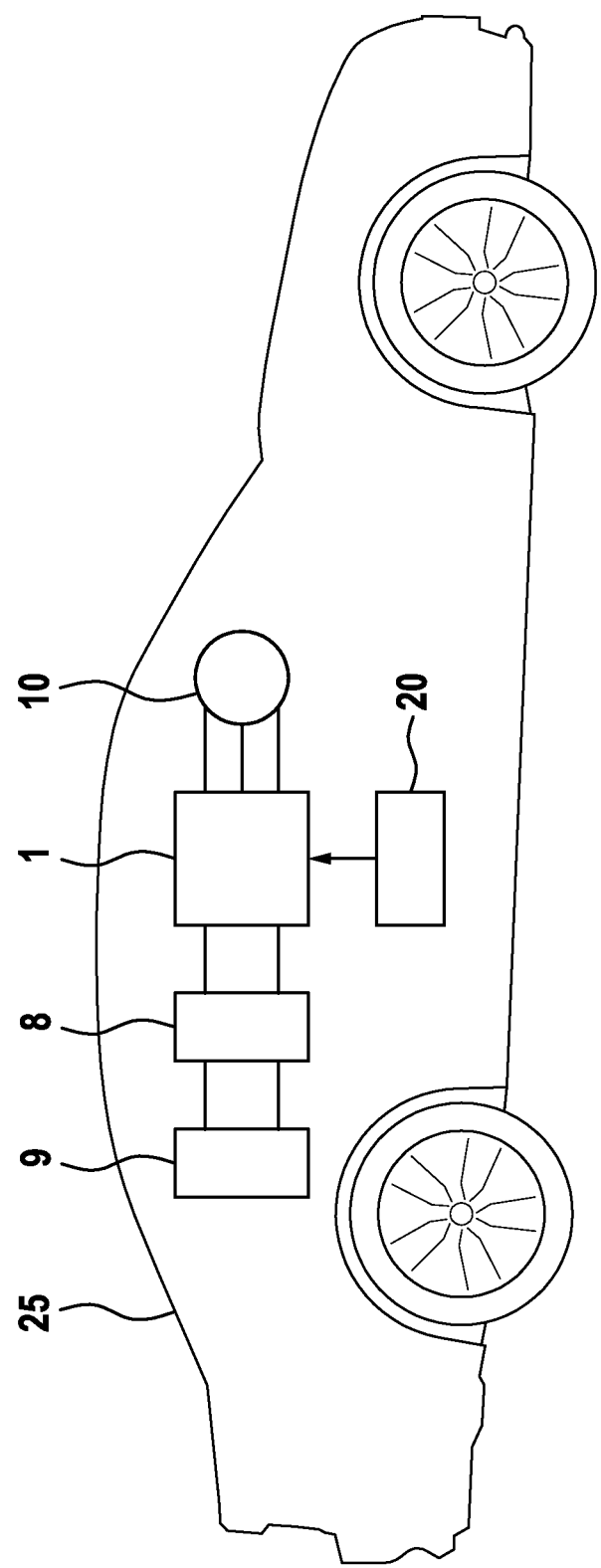

Further advantages and details of the present invention will be apparent from the embodiments described below and from the drawings. These are schematic representations and show:

FIG. 1 a circuit diagram of an embodiment of the inverter according to the invention with an embodiment of the control device according to the invention;

FIG. 2 curves of voltage at a DC input, phase currents at an AC output, and torque over time during operation of the inverter shown in FIG. 1; and FIG. 3 a schematic sketch of a vehicle according to the invention.

FIG. 1 is a circuit diagram of an embodiment of an inverter 1 with an embodiment of a control device 2. In addition, the inverter comprises a DC voltage input 3, an AC voltage output 4, a power unit 5, and a DC link capacitor 6 connected in parallel with the DC voltage input 3. A voltage detection unit 7 is further provided for detecting a DC voltage U applied across the DC link capacitor 6 or at the DC voltage input 3.

The DC voltage input 3 is connected to a DC voltage source 9 in the form of a high-voltage battery via a two-pole isolating device 8 formed by contactors, which provides the DC voltage U at the DC voltage input 3 when the isolating device 8 is closed. This is converted by the inverter 1 into a polyphase, here three-phase, AC voltage provided at its AC output 4. An electrical machine in the form of an asynchronous machine 10 is connected to this output.

The power unit 5 comprises three half-bridges 11u, 11v, 11w, each formed by a series connection of power switching elements 13u, 13v, 13w connected to an upper potential 12 of the DC voltage input 3 and power switching elements 15u, 15v, 15w connected to a low potential 14 of the DC voltage input 3. Each power switching element 13u, 13v, 13w, 15u, 15v, 15w comprises an insulated gate bipolar transistor (IGBT) 16 and a diode 17 connected in parallel therewith. Alternatively, a respective power switching element 13u, 13v, 13w, 15u, 15v, 15w may be implemented by a power MOSFET. A center tap 18 of a respective half-bridge 11u, 11v, 11w is connected to the AC voltage output 4, at which phase currents Iu, Iv, Iw can be provided for the asynchronous machine 10.

The control device 2 is arranged to convert the power switching elements 13u, 13v, 13w, 15u, 15v, 15w in a normal, clocked operating mode for converting the DC voltage U applied to the DC voltage input 3 into the polyphase AC current. In the normal operating mode, recuperation operation is also possible, in which the electric machine 10 is operated as a generator and feeds electrical energy back to the high-voltage battery. For control, the control device 2 is connected to a control input 19 of a respective power switching element 13u, 13v, 13w, 15u, 15v, 15w.

In the event of a fault condition detected by an external control device 20, a load shedding is initiated by the control device providing a signal 21 which triggers the disconnecting device 8 to open the contactors and thus disconnect the DC voltage source 9 from the DC voltage input 3. The signal 21, which accordingly indicates the disconnection of the DC voltage source 9 from the DC voltage input 3, is further present at an input 22 of the control device 2. The signal 21 is alternatively or additionally generated internally in the control device 2 when the latter itself detects a load shedding.

The control unit 2 evaluates whether the signal 21 is present and whether the inverter 1 is in recuperation mode at that time. If this is the case, the control unit 2 terminates the normal operation mode and initiates a load shedding operation mode in which it controls the power switching elements 13u, 13v, 13w, 15u, 15v, 15w to alternately adopt a first switching pattern that causes DC braking and a second switching pattern that causes freewheeling.

For this purpose, the control device 2 determines the first switching pattern which causes the DC braking as a function of current values which describe the phase currents Iu, Iv, Iw. For this purpose, a look-up table is stored within the control device 2, which assigns corresponding switching states of the power switching elements 13u, 13v, 13w, 15u, 15v, 15w to the currents Iu, Iv Iw and their derivatives after the time dIu/dt, dIv/dt, dIw/dt at the moment of termination of the clocked operation. The following table shows this assignment:

| $I_u$ | $\dfrac{dI_u}{dt}$ | $I_v$ | $\dfrac{dI_v}{dt}$ | $I_w$ | $\dfrac{dI_w}{dt}$ | 13u | 13v | 13w | 15u | 15v | 15w |
|---|---|---|---|---|---|---|---|---|---|---|---|
| >0 | <0 | <0 | >0 | — | — | 1 | 0 | 0 | 0 | 1 | 0 |
| >0 | <0 | — | — | <0 | >0 | 1 | 0 | 0 | 0 | 0 | 1 |
| <0 | >0 | >0 | <0 | — | — | 0 | 1 | 0 | 1 | 0 | 0 |
| — | — | >0 | <0 | <0 | >0 | 0 | 1 | 0 | 0 | 0 | 1 |
| <0 | >0 | — | — | >0 | <0 | 0 | 0 | 1 | 1 | 0 | 0 |
| — | — | <0 | >0 | >0 | <0 | 0 | 0 | 1 | 0 | 1 | 0 |

Here, a "1" means that the respective switching element 13u, 13v, 13w, 15u, 15v, 15w is controlled for conducting, and a "0" means that it is controlled for blocking. The second switching pattern realizing the freewheel describes that all power switching elements 13u, 13v, 13w, 15u, 15v, 15w are driven for blocking.

The alternate switching between the first switching pattern and the second switching pattern is time-controlled in the present embodiment. That is, the control device 2 controls the power switching elements 13u, 13v, 13w, 15u, 15v, 15w in each case for a predetermined period of time in accordance with the first switching pattern or the second switching pattern.

This alternating switching is terminated when the DC voltage U does not exceed a predetermined voltage threshold during switching of the second switching pattern, i.e. the freewheel. For this purpose, the control device 2 evaluates voltage values which are provided to it by the voltage detection unit 7 at an input 23. After completion of the alternate switching, the control device 2 controls the power switching elements 13u, 13v, 13w, 15u, 15v, 15w permanently according to the second switching pattern, which realizes a safe operating state.

FIG. 2 shows curves of the DC voltage U, the phase currents Iu, Iv, Iw and a resulting torque M of the asynchronous machine 10 over time t in an exemplary configuration of the inverter 1. At a time t0, load shedding occurs and the control device 2 transfers the inverter from the normal operating mode to the load shedding operating mode.

Before time t0, the asynchronous machine 10 is in recuperation mode, which can be seen from the negative torque M, the essentially harmonic course of the phase currents Iu, $I_v$, Iw and the only slightly oscillating course of the dc voltage U. At time t0, the phase current Iu has just passed its maximum. The phase current $I_v$ is just before the zero crossing and increases. It is therefore valid:

$$I_u > 0 \bigwedge \frac{dI_u}{dt} < 0 \bigwedge I_v < 0 \bigwedge \frac{dI_v}{dt} > 0$$

Consequently, the control device 2 determines the first switching pattern for DC braking according to the table shown previously, in which the power switching elements 13u, 15v conduct and the other power switching elements 13v, 13w, 15u, 15w block. The control device 2 then controls the power switching elements 13u, 13v, 13w, 15u, 15v, 15w according to the determined first switching pattern for a predetermined duration. Subsequently, the control device 2 controls all power switching elements 13u, 13v, 13w, 15u, 15v, 15w for a predetermined duration for blocking, i.e. in accordance with the second switching pattern that implements freewheeling.

Switching alternates between the two switching patterns until the DC voltage U no longer exceeds a voltage threshold value, which is indicated by a dashed line 24 in FIG. 2, at a time t1. From time t1, the power switching elements 13u, 13v, 13w, 15u, 15v, 15w are permanently driven according to the second switching pattern. As can further be seen from FIG. 2, the phase currents Iu, Iv, Iw decay between the times t0 and t1 without large current peaks and there is only a slight change in the torque M for a short time.

According to a further embodiment, the alternating switching between the first and the second switching pattern is not time-controlled, but voltage-controlled. In this case, the control device 2 switches between the switching patterns in each case when the voltage value provided by the voltage detection unit 7 reaches a voltage threshold value defined for a respective switching pattern.

FIG. 3 is a schematic sketch of an embodiment of a vehicle 25 comprising an inverter 1 according to one of the embodiments described above. Analogously to FIG. 1, the inverter 1 is connected via a disconnecting device 8 to a DC voltage source 9, to an asynchronous machine 10, which is set up to drive the vehicle 25, and to a higher-level control unit 20.

The invention claimed is:

1. Control device for an inverter which has a DC voltage input and a power unit with three half-bridges each being formed by two power switching elements, the control device being arranged to drive the power switching elements in a normal operating mode for converting a DC voltage applied to the DC voltage input into a polyphase AC current provided at an AC current output, wherein the control device is adapted to evaluate a signal state of a signal indicating a disconnection of a DC voltage source from the DC voltage input, and to control the power switching elements as a function of a result of evaluation for alternately adopting a first switching pattern which effects DC braking and a second switching pattern which effects freewheeling, and the first switching pattern includes, in one of three half-bridges, one power switching element connected to a first potential of the DC voltage input is in a blocking state and another power switching element is in a conducting state; in another of the three half-bridges, one power switching element connected to a second potential of the DC voltage input is in a blocking state and another power switching element is in a conducting state; and in another of the three half-bridges, both power switching elements are in a blocking state.

2. Control device according to claim 1, which is further arranged to evaluate, in addition to the signal state, whether the inverter is in a recuperation mode.

3. Control device according to claim 1, which is further arranged to switch from the first switching pattern to the second switching pattern after a predetermined period of time has elapsed and/or to switch from the second switching pattern to the first switching pattern after a predetermined period of time has elapsed.

4. Control device according to claim 1, which is further adapted to control the alternate driving in dependence on a voltage value describing a voltage at the DC voltage input.

5. Control device according to claim 4, which is further adapted to switch from the first switching pattern to the second switching pattern upon detection of reaching of a voltage threshold value by the voltage value and/or to switch from the second switching pattern to the first switching pattern upon detection of reaching of a voltage threshold value by the voltage value.

6. Control device according to claim 4, which is further adapted to permanently drive the power switching elements to adopt a switching pattern effecting a safe operating condition when the voltage value does not exceed a predetermined voltage threshold when driving the power switching elements with the second switching pattern.

7. Control device according to claim 6, wherein the switching pattern causing the safe operating condition is the second switching pattern.

8. Inverter for an asynchronous machine, comprising a DC input, a power unit with three half-bridges formed by two power switching elements each, and the control device according to claim 1.

9. Vehicle comprising the asynchronous machine for driving the vehicle and the inverter according to claim 8.

10. Control device for an inverter which has a DC voltage input and a power unit with three half-bridges each being formed by two power switching elements, the control device being arranged to drive the power switching elements in a normal operating mode for converting a DC voltage applied to the DC voltage input into a polyphase AC current provided at an AC current output, wherein the control device is adapted to evaluate a signal state of a signal indicating a disconnection of a DC voltage source from the DC voltage input, and to control the power switching elements as a function of a result of evaluation for alternately adopting a first switching pattern which effects DC braking and a second switching pattern which effects freewheeling, and to determine the first switching pattern in dependence on at least one current value describing a current flowing at the AC voltage output, and wherein alternate switching between the first switching pattern and the second switching pattern is controlled for a predetermined period of time in accordance with the first switching pattern or the second switching pattern, the alternate switching being terminated when the DC voltage does not exceed a predetermined voltage threshold during switching of the second switching pattern.

11. Control device according to claim 10, wherein the first switching pattern describes switching a power switching element connected to a high potential of the DC input to a conductive state when a current from a center tap of the half-bridge formed by the power switching element is positive and a change of the current after time is negative.

12. Control device according to claim 11, wherein the switching pattern describes the switching of the remaining power switching elements connected to the high potential of the DC voltage input to a blocking state.

13. Control device according to claim 10, wherein the first switching pattern describes switching a power switching element connected to low potential of the DC input to a conductive state when a current from a center tap of the half-bridge formed by the power switching element is negative and a change in the current after time is positive.

14. Control device according to claim 13, wherein the first switching pattern describes switching the remaining power switching elements connected to the low potential of the DC input to a blocking state.

15. Method of operating an inverter which has a DC input and a power unit having three half-bridges formed by two power switching elements each, comprising the following steps:

driving the power switching elements in a normal operating mode to convert a DC voltage applied to the DC input into a polyphase AC current provided at an AC output;

evaluating a signal state of a signal indicating a disconnection of a DC voltage source from the DC voltage input; and driving the power switching elements in dependence on a result of evaluation to alternately adopt a first switching pattern that causes DC braking and a second switching pattern that causes freewheeling, wherein the first switching pattern includes, in one of three half-bridges, one power switching element connected to a first potential of the DC voltage input is in a blocking state and another power switching element is in a conducting state; in another of the three half-bridges, one power switching element connected to a second potential of the DC voltage input is in a blocking state and another power switching element is in a conducting state; and in another of the three half-bridges, both power switching elements are in a blocking state.

* * * * *